UNITED STATES PATENT OFFICE.

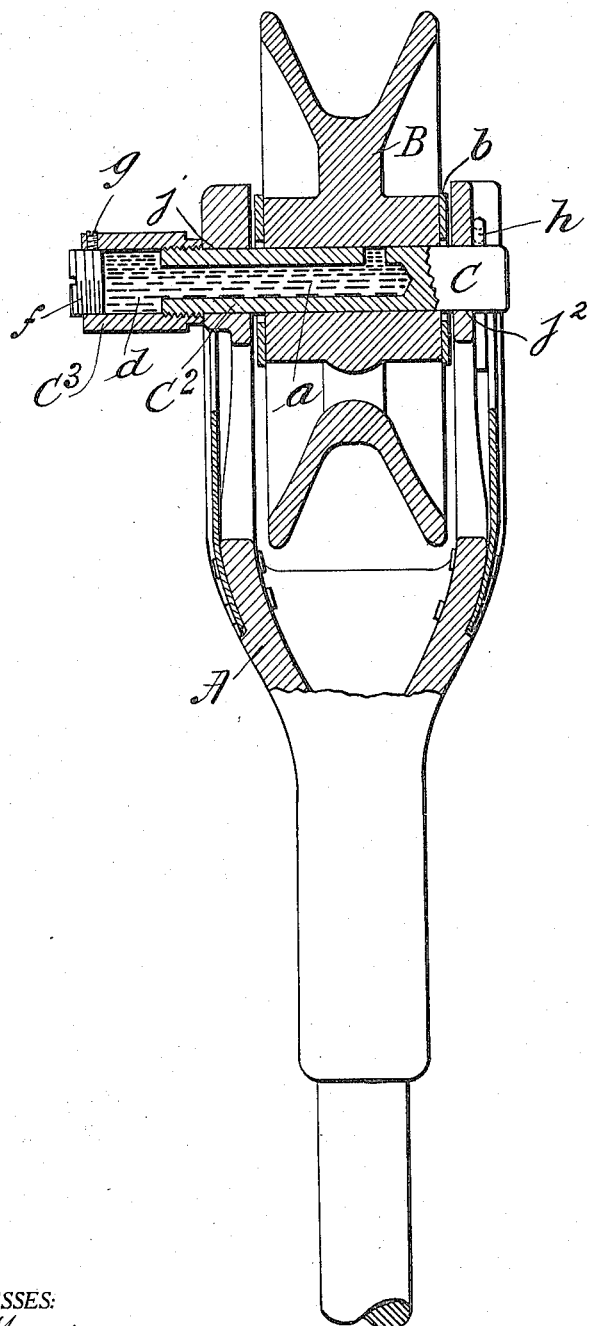

CHARLES W. ARIAL, OF COLERAIN, MASSACHUSETTS.

TROLLEY.

1,157,608.

Specification of Letters Patent.

Patented Oct. 19, 1915.

Application filed February 15, 1915. Serial No. 8,173.

*To all whom it may concern:*

Be it known that I, CHARLES W. ARIAL, a citizen of the United States of America, and resident of Colerain, in the county of Franklin and State of Massachusetts, have invented certain new and useful Improvements in Trolleys, of which the following is a full, clear, and exact description.

This invention relates to improved constructions of trolleys for electric railway cars whereby the bearing between the trolley wheel and the axle carried by the harp is accomplished in an efficient manner and with the economical use of the grease employed; and whereby the lubricant carrying and expelling part of the trolley may be employed with unusual facility and convenience.

The invention is described in conjunction with the accompanying drawings and is set forth in the claim.

In the drawings, the figure is a central vertical sectional view through the trolley on the plane of the axis of the trolley wheel and fully and clearly showing the improved construction.

In the drawing, A represents the harp, B the trolley wheel and C the axle, the latter being mounted in the jaws of the harp, and the wheel being mounted on the axle as usual. The opposite jaws of the harp have horizontal axially alined holes $j$, $j^2$, and the axle, at the end portion which is passed through both of the holes to bring it to its proper place in the harp, is of no greater diameter than other portions in the length of the axle. The axle has an axial passage $a$ extending from one end to an intermediate part thereof, and having a short passage or port $b$ leading to its periphery. The said passage is enlarged at its open end portion to form a grease chamber $d$, and within the so chambered portion is provided a slotted screw plug $f$ for crowding the grease with which the chamber $d$ and passage $a$ is filled for expulsion through the said port for the lubrication of the bearing between the axle and the wheel. The screw $g$ is provided radially within the wall surrounding the said grease chamber $d$ for detachably locking the screw plug $f$ against being turned, excepting when it is desired to turn such plug for the expulsion of the lubricant to the bearing surface between the axle and wheel which has a close running fit on the axle.

As specifically made, the axle consists of a portion $C^2$ in which the passage $a$ and port $b$ are formed, and a sleeve-like second portion $C^3$ of greater diameter than the portion $C^2$ having a cylindrical passage therein of greater diameter than that of the passage $a$, the said portion $C^3$ being screw engaged with the outer end of the axle $C^2$,—the said portion $C^3$ having the screw plug and set screw provided therein as shown. The inner end of the part $C^3$ forms a shoulder for engagement against the outer face of one jaw of the harp, and the axle is retained in the harp in the usual manner by a cotter pin $h$ extending transversely through the portion of the axle near its end opposite that at which the grease chamber is provided. The axle, tubular for a considerable portion of its length and having the chambered head enlargement is filled,—the screw plug being removed,—with a heavy grease or lubricating composition; and the screw plug is inserted and locked. From time to time as the lubricant shall be expelled to the bearing, the screw plug is unlocked and rotated in a sufficient extent to force the grease through the radial port to the bearing. When the grease may have become exhausted within the receiving chamber therefor, the supply thereof may be replenished in the axle without the removal of the latter from the harp; and, furthermore, when it is desired to remove the axle and its appurtenances from the harp, as, for instance to permit the replacement of a worn out wheel by a new one, or to transfer the lubricating axle from a broken or defective harp to another harp, such, as manifest, may be readily done without the detachment of the sleeve-like member $C^3$ from the axle proper, $C^2$.

By making the lubricating axle in the two parts $C^2$ and $C^3$, after the portion $C^2$ which, only, is subjected to wear, shall have become reduced and impaired, the axle may be removed from the harp, part $C^2$ may be disconnected from part $C^3$, and replaced by a new and unworn part $C^2$, thereby saving somewhat in the cost of replacement of a whole axle.

The part $C^3$ may be produced from round stock of comparatively large diameter while the part $C^2$ may be produced from round stock of smaller diameter, and, therefore, in addition to the advantage of replacement of one of the parts, only, as occasion may require, the axle as a whole may be made with an economy of stock as it is not necessary to turn down a large diametered bar to the reduced diameter of the part C².

I claim:—

In a trolley, the combination with the harp, having horizontal axially alined holes in the opposite jaws thereof, and the trolley wheel, of an axle, for supporting the wheel having one end portion of no greater diameter than that of other portions of the length thereof and engaged through the holes in the jaws of the harp and supported by the latter, consisting of a portion having an axial passage extending from its one end to an intermediate part thereof, and having at such intermediate part a connecting short passage or port leading outwardly to its periphery, and a sleeve-like member of larger diameter than the axle proper having a cylindrical passage therethrough screw engaged with and forming a shoulder for the axle proper opposite its non-enlarged end, a grease expelling plug screw-engaged within the outer end of said sleeve-like member, a set screw inserted radially in said sleeve-like member for detachably locking said plug therein, the said so combined and arranged parts permitting the removal of the axle from the harp without the disconnection of the plug-provided sleeve-like member from the axle proper, and means provided at the non-enlarged end of the axle for preventing the displacement of the latter from the jaws of the harp.

Signed by me at Colerain, Mass., in presence of two subscribing witnesses.

CHARLES W. ARIAL.

Witnesses:
CLIFTON L. McKNIGHT,
MERTON Z. WOODWARD.